United States Patent
Ozaki et al.

(10) Patent No.: US 10,258,949 B2
(45) Date of Patent: Apr. 16, 2019

(54) GRANULATED BODY MANUFACTURING APPARATUS AND METHOD

(71) Applicant: TOYOTA JIDOSHA KABUSHIKI KAISHA, Toyota-shi, Aichi-ken (JP)

(72) Inventors: Takeyuki Ozaki, Toyota (JP); Yasuhiro Sakashita, Toyota (JP); Takenori Ikeda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 212 days.

(21) Appl. No.: 15/365,306

(22) Filed: Nov. 30, 2016

(65) Prior Publication Data

US 2017/0157642 A1   Jun. 8, 2017

(30) Foreign Application Priority Data

Dec. 4, 2015   (JP) .................... 2015-237161

(51) Int. Cl.
*B01F 9/08* (2006.01)
*B01J 2/10* (2006.01)
*B01J 2/00* (2006.01)

(52) U.S. Cl.
CPC ............ *B01J 2/10* (2013.01); *B01F 9/08* (2013.01); *B01J 2/00* (2013.01)

(58) Field of Classification Search
CPC ........................................ B01F 9/08
USPC ............................... 366/222–224
See application file for complete search history.

(56) References Cited

U.S. PATENT DOCUMENTS

| 75,129 A | * | 3/1868 | Custer | B01F 9/08 366/222 |
| 798,280 A | * | 8/1905 | Hanson | B01F 9/08 366/222 |
| 861,561 A | * | 7/1907 | Virtue | B01F 9/08 366/222 |

FOREIGN PATENT DOCUMENTS

| JP | 60-179130 A | 9/1985 |
| JP | 10-216575 A | 8/1998 |
| JP | 2012-255145 A | 12/2012 |
| JP | 201779191 A | 4/2017 |

* cited by examiner

*Primary Examiner* — David L Sorkin
(74) *Attorney, Agent, or Firm* — Sughrue Mion, PLLC (57) ABSTRACT

A granulated body manufacturing apparatus includes: a housing that includes a cylindrical internal space, is disposed so that a center axis direction of the internal space is horizontal, and houses a raw material for a granulated body inside the internal space; an agitation blade that is provided along an inner circumferential surface of the internal space, and upon being rotated around the center axis, scoops up the raw material accumulated in a bottom portion of the internal space and makes the raw material fall down from an upper position inside the internal space; and a crossing blade including a wire having a wire diameter not exceeding 0.3 mm, the wire being provided at a position in a range, inside the internal space, in which the crossing blade does not come into contact with the agitation blade, and being looped around a framework body that rotates around the center axis.

8 Claims, 9 Drawing Sheets

GRANULATED BODY MANUFACTURING APPARATUS AND METHOD

INCORPORATION BY REFERENCE

The disclosure of Japanese Patent Application No. 2015-237161 filed on Dec. 4, 2015 including the specification, drawings and abstract is incorporated herein by reference in its entirety.

BACKGROUND

1. Technical Field

The disclosure relates to an apparatus and method for manufacturing a granulated body having a relatively-small liquid component content such as moist powder.

2. Description of Related Art

For forming a thin layer on a solid body, a coating process is used. In the coating process, a solid body is coated with a fluid substance (paste or slurry) obtained by kneading powder, which is a raw material for the thin layer, with a liquid. Subsequently, a drying process is performed to remove the liquid, whereby a layer of an aggregate of the powder is formed on the solid body. The processes such as above are used in, for example, manufacture of an electrode plate for a secondary battery.

Because of large burden in the drying process here, in recent years, attempts have been made to use moist powder with a reduced ratio of the liquid in the fluid substance. As a method for obtaining such moist powder with a reduced liquid ratio, the technique described in Japanese Patent Application Publication No. 10-216575 can be employed. In the technique in JP 10-216575 A, a slurry including a solid cake and a solvent is sprayed to remove the solvent and obtain granulated powder. The granulated powder obtained as stated above has a small liquid component content, and thus, can be considered as moist powder such as mentioned above.

SUMMARY

However, the aforementioned technique has the following problems. If moist powder is used as a raw material for coating for forming a thin layer, it is preferable that the moist powder have a small particle diameter and a low bulk density. However, in the technique in JP 10-216575 A, particle diameter control is possible to a certain extent but insufficient. Thus, it is necessary to perform fining by some means. In general, the fining is performed by cutting powder using a member called a fining blade or the like. However, this process adversely causes increase in bulk density. This process involves an adverse effect of the granulated body being crushed and thereby compressed by the fining blade.

The disclosure provides an apparatus and method for manufacturing a granulated body having a small liquid component content, a small particle diameter and a low bulk density.

A granulated body manufacturing apparatus according to a first aspect of the disclosure includes: a housing that includes a cylindrical internal space, is disposed so that a center axis direction of the internal space is horizontal, and houses a raw material for a granulated body inside the internal space; an agitation blade that is provided along an inner circumferential surface of the internal space, and upon being rotated around the center axis, scoops up the raw material accumulated in a bottom portion of the internal space and makes the raw material fall down from an upper position inside the internal space; and a crossing blade including a wire having a wire diameter not exceeding 0.3 mm, the wire being provided at a position in a range, inside the internal space, in which the crossing blade does not come into contact with the agitation blade, and upon being rotated around the center axis, crossing a route of the fall of the raw material and fining the raw material, and being looped around a framework body that is provided at a position in a range, inside the internal space, in which the framework body does not come into contact with the agitation blade, and rotates around the center axis.

In the granulated body manufacturing apparatus according to the above aspect, rotation of the agitation blade causes the raw material to be agitated. As a result of the agitation, the raw material is subjected to a process of falling downward from the upper portion inside the internal space. Here, the route of the fall of the raw material and a route of movement of the rotating crossing blade cross. Thus, the falling raw material is cut by the crossing blade, whereby the raw material is made to be finer and have a lower bulk density. Since the crossing blade is a thin wire, the falling raw material is prevented from having a high bulk density as a result of being crushed by the crossing blade. Therefore, a granulated body having a small particle diameter and a low bulk density is manufactured. The same applies to a case where a ratio of a liquid component in a raw material is low.

In the above aspect, the framework body may include a hub portion that receives a rotational driving force from a rotation driving source, a first branch portion projecting outward from the hub portion, and a second branch portion projecting outward from the hub portion at a site that is different in an axis direction from that of the first branch portion, and the wire may be looped around the first branch portion and the second branch portion. Such configuration enables provision of a configuration that allows the hub portion to receive a rotational driving force from the rotation driving source and thereby rotate and causes the rotation to move the wires (crossing blades) inside the internal space so as to cross the route of the fall of the raw material.

In the above configuration, the first branch portion and the second branch portion may be provided at respective positions that are different from each other also in a circumferential direction around the axis. Consequently, a granulated body with the whole raw material more homogeneously mixed can be obtained. This is because since the wires (crossing blades) are arranged obliquely relative to the axis direction, a force received from the wires makes the raw material move also in the axis direction to a certain extent.

In the above aspect, a rotation speed of the framework body may be higher than a rotation speed of the agitation blade. This is because, although the rotation speed of the agitation blade is not required to be so high, a higher rotation speed of the crossing blade is better. If the rotation speed of the crossing blade is high, the cutting of the raw material, which is falling downward from the upper portion inside the internal space by the agitation blade, by the crossing blade is performed with a high frequency, which is advantageous in each of viewpoints of fining, bulk density decrease and more homogenous mixing.

A granulated body manufacturing method according to a second aspect of the disclosure includes: housing a raw material for a granulated body in a cylindrical internal space disposed so that a center axis direction of the cylindrical internal space is horizontal; rotating an agitation blade around the center axis, the agitation blade being provided along an inner circumferential surface of the internal space, and scooping up the raw material accumulated in a bottom portion of the internal space and making the raw material fall from an upper position inside the internal space; and rotating a crossing blade around the center axis, the crossing blade being provided at a position in a range, inside the internal space, in which the crossing blade does not come into contact with the agitation blade, making the crossing blade cross a route of the fall of the raw material and fining the raw material, a wire having a wire diameter not exceeding 0.3 mm being used for the crossing blade, the wire being looped around a framework body that is provided at a position in a range, inside the internal space, in which the framework body does not come into contact with the agitation blade, and rotates around the center axis. This is a granulated body manufacturing method to be performed by a granulated body manufacturing apparatus according to the aforementioned aspect.

A granulated body manufacturing method according to a third aspect of the disclosure includes: housing a raw material for a granulated body in a cylindrical internal space disposed so that a center axis direction of the cylindrical internal space is horizontal; rotating an agitation blade around the center axis, the agitation blade being provided along an inner circumferential surface of the internal space, scooping up the raw material accumulated in a bottom portion of the internal space, making the raw material fall from an upper position inside the internal space and fining the raw material; and injecting a foamed liquid containing a surfactant agent into the internal space while rotating the agitation blade, and mixing the raw material with the liquid.

In this manufacturing method, a foaming action of the surfactant agent causes the raw material to be mixed with a liquid with air contained therein. Consequently, a granulated body having a small particle diameter and a low bulk density is manufactured. The same applies to a case where a ratio of a liquid component in the raw material is low. The manufacturing method is in common with the manufacturing apparatus or manufacturing method according to the above aspects in that a granulated body is obtained while a raw material is being agitated in the internal space. Therefore, problems of the related art that are solved by the manufacturing apparatus and manufacturing methods according to all of the above aspects correspond to one another or overlap with one another in intending to obtain a finer granulated body having a low bulk density compared to the related art, and thus the above aspects of the disclosure have common technical significance in comparison to the related art, and have corresponding special technical features.

The above aspect provides an apparatus and method for manufacturing a granulated body having a small liquid component content, a small particle diameter and a low bulk density.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A first embodiment of the disclosure will be described in detail below with reference to the attached drawings. The present embodiment is one in which the first aspect of the disclosure has been applied to a granulated body manufacturing apparatus 1 illustrated in FIG. 1 and a granulated body manufacturing method using the same. The manufacturing apparatus 1 in FIG. 1 includes a housing 3 including a cylindrical internal space 2 formed inside. The housing 3 is disposed so that a center axis direction of the internal space 2 is horizontal. In the housing 3, an inlet 7 for putting powder into the internal space 2 is provided. The inlet 7 is provided in an upper portion of the housing 3.

Inside the internal space 2 of the housing 3, agitation blades 4 and crossing blades 5 are provided. The agitation blades 4 and the crossing blades 5 both rotate around the center axis of the internal space 2. However, while the agitation blades 4 are provided so as to, upon being rotated, move along a cylindrical inner circumferential surface 6 of the internal space 2, the crossing blades 5 are provided in the vicinity of the center axis of the internal space 2. Consequently, even if the agitation blades 4 and the crossing blades 5 rotate, the agitation blades 4 and the crossing blades 5 are prevented from coming into contact with each other.

Figure 1:
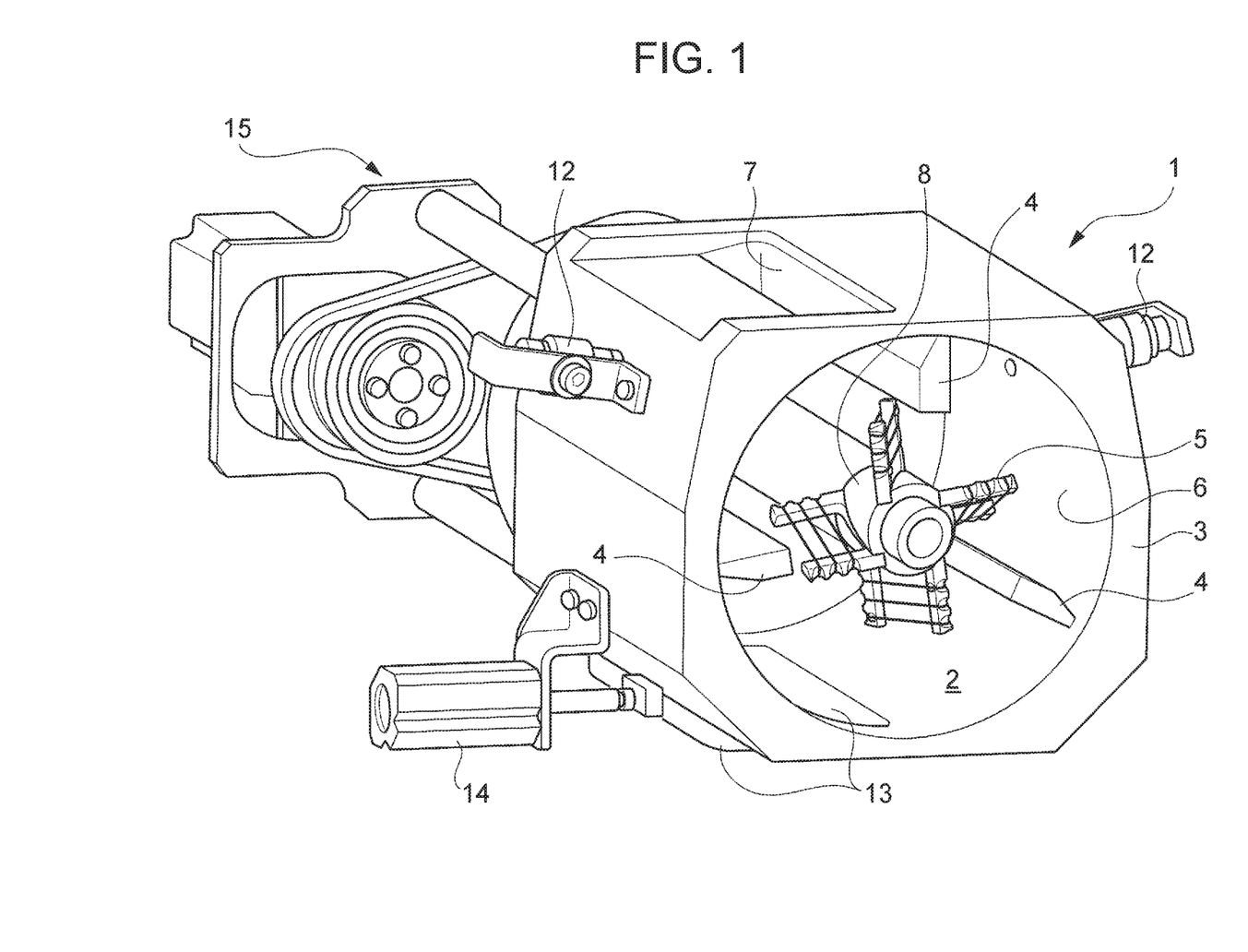
FIG. 1 is a perspective view of a granulated body manufacturing apparatus according to a first embodiment.
Figure 2:
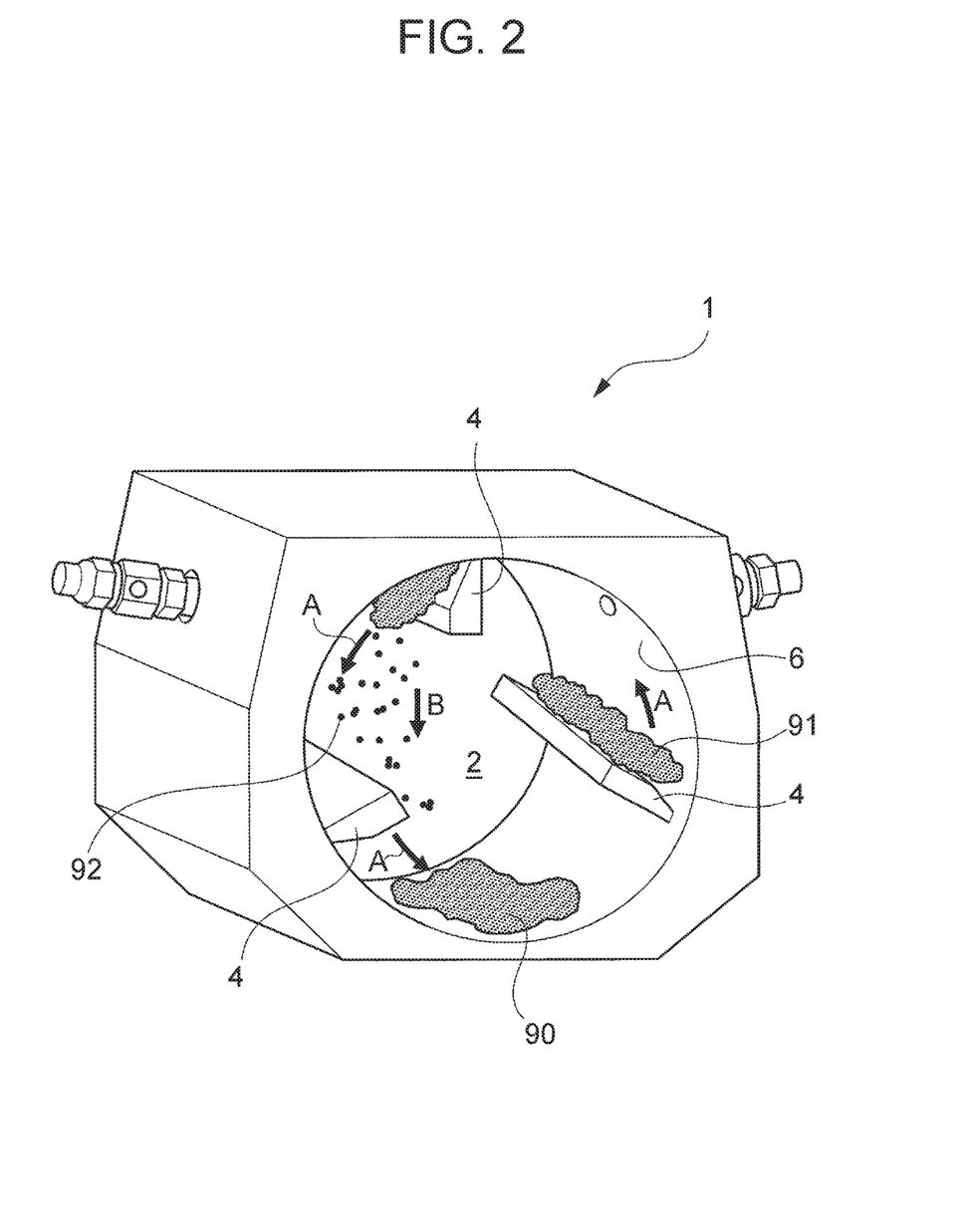
FIG. 2 is a perspective view illustrating agitation of powder in the granulated body manufacturing apparatus.

The agitation blades 4 are a plurality of long flat plate members disposed in parallel with the center axis direction of the internal space 2 along the inner circumferential surface 6. In FIG. 1, three members can be seen as if the members are provided separately as the agitation blades 4, but the three agitation blades 4 are actually connected and integrally rotate around the center axis of the internal space 2. Consequently, as illustrated in FIG. 2, rotation of the agitation blades 4 as indicated by arrows A causes agitation of powder. In other words, powder 90 accumulated in a bottom portion of the internal space 2 is scooped up by a rotating agitation blade 4. When the scooped powder 91 reaches the upper portion of the internal space 2, the powder 91 slips down from the agitation blade 4 and falls down as indicated by arrow B. The falling powder 92 is accumulated in the bottom portion of the internal space 2 again. As a result of repetition of this process, the powder 90 is agitated. FIG. 2 provides simplified illustration with the crossing blades 5 omitted.

Figure 3:
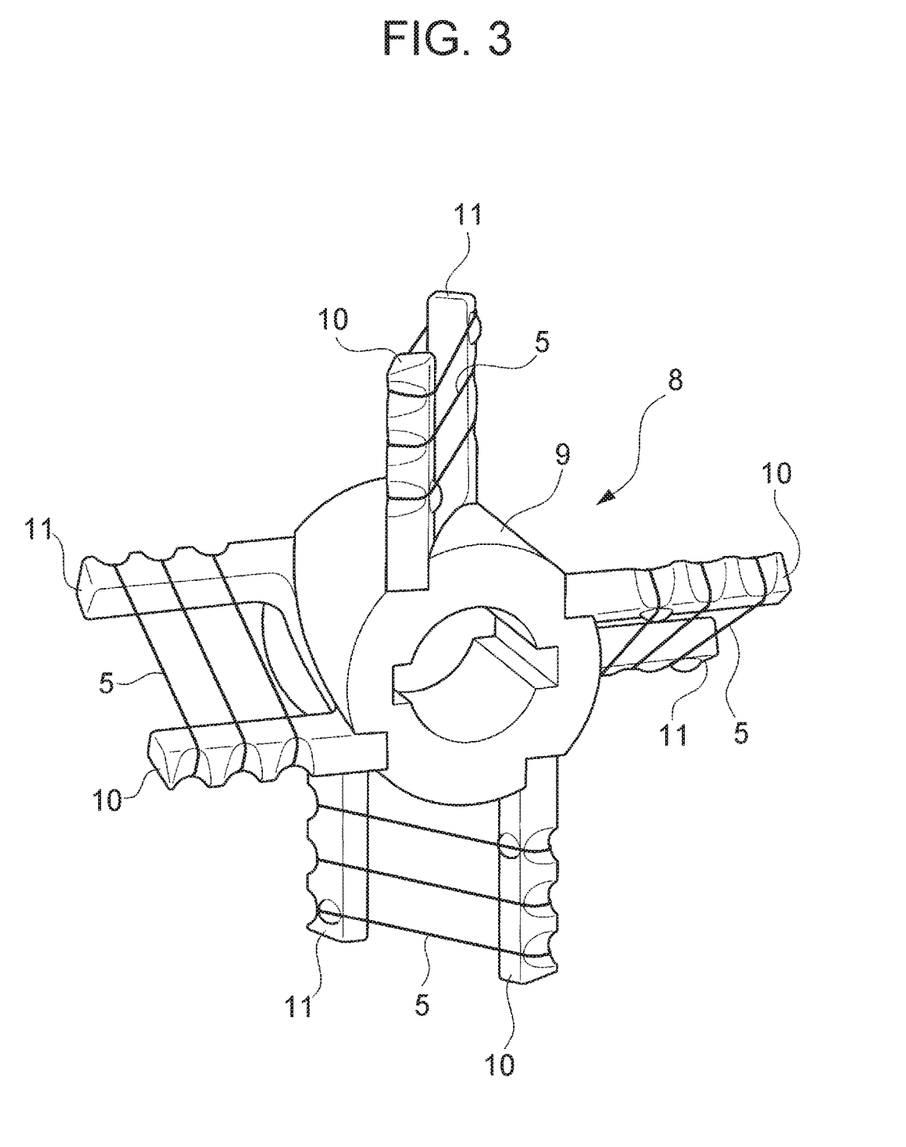
FIG. 3 is a perspective view illustrating crossing blades in the granulated body manufacturing apparatus.

The crossing blades 5 are configured as illustrated in FIG. 3. The crossing blades 5 are equipped with a framework body 8. The crossing blades 5 actually include wires looped around the framework body 8. The framework body 8 includes a hub portion 9, first branch portions 10 and second branch portions 11. The hub portion 9 is a cylindrical member, and as described later, is a part that receives a rotational driving force for rotating the crossing blades 5. However, the hub portion 9 is much smaller than the internal space 2. Each of the first branch portions 10 and the second branch portions 11 is a part having a shape projecting outward from the hub portion 9. As a matter of course, a height of the projection of each of the first branch portions 10 and the second branch portions 11 from the hub portion 9 is a height in a range in which a tip of the projection does not collide with the agitation blades 4 even during rotation.

A first branch portion 10 and a second branch portion 11 are provided at respective positions that are different from each other in an axis direction in the hub portion 9. In other words, the first branch portion 10 is provided at a position on the front side in FIG. 3 in the axis direction in the hub portion 9. On the other hand, the second branch portion 11 is provided at a position on the back side in FIG. 3 in the axis direction. In the framework body 8, four pairs of the first branch portion 10 and the second branch portion 11 are provided. In each of the pairs of the first branch portion 10 and the second branch portion 11, wires are looped around the first branch portion 10 and the second branch portion 11. The crossing blades 5 are configured as described above. Also, each first branch portion 10 and the corresponding second branch portion 11 in the framework body 8 are provided at respective positions that are different from each other also in a circumferential direction around the axis of the hub portion 9. Thus, wires (crossing blades 5) looped around the first branch portion 10 and the second branch portion 11 are arranged in a direction inclined relative to the axis direction.

Referring back to FIG. 1, in the housing 3, furthermore, injection nozzles 12 and an outlet door 13 are provided. Each of the injection nozzles 12 is a nozzle for injecting a liquid component into the internal space 2. The outlet door 13 is an opening/closing door for discharging a manufactured granulated body from the internal space 2. An opening/closing lever 14 is provided at the outlet door 13. As can be seen, the outlet door 13 in FIG. 1 is in a closed state, but the outlet door 13 can be opened/closed by operation of the opening/closing lever 14.

Figure 4:
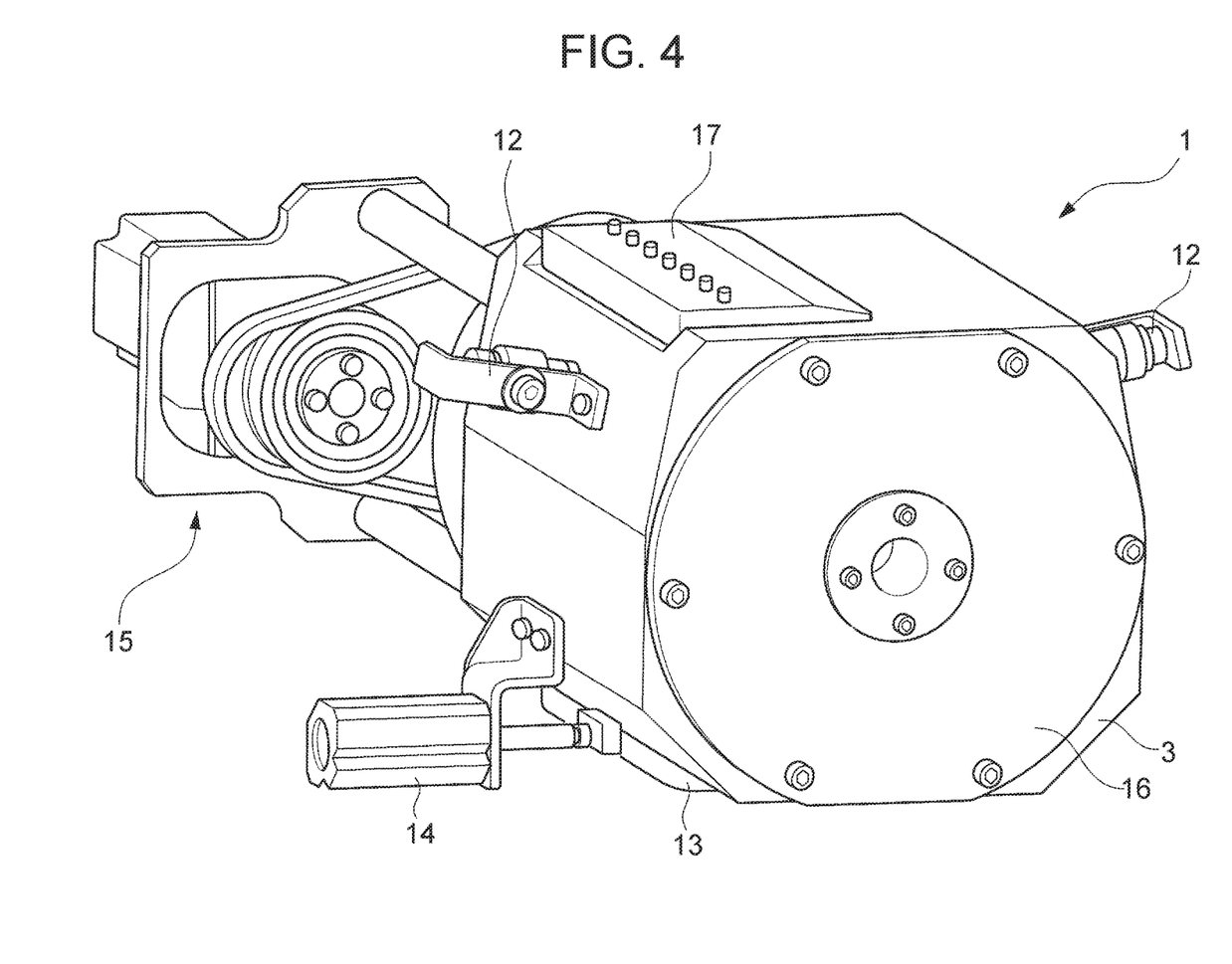
FIG. 4 is a perspective view of the granulated body manufacturing apparatus in FIG. 1 in use.

In FIG. 1, the internal space 2 is illustrated as if the front side of the internal space 2 is open; however, in actual use, the manufacturing apparatus 1 is in a state illustrated in FIG. 4. In the manufacturing apparatus 1 in the state in FIG. 4, the front side of the internal space 2 illustrated in FIG. 1 is occluded by a front lid 16. Also, the inlet 7 is closed by an upper lid 17. In the state in FIG. 4, as a matter of course, neither the agitation blades 4 nor the crossing blades 5 inside the housing 3 can be seen.

Figure 5:
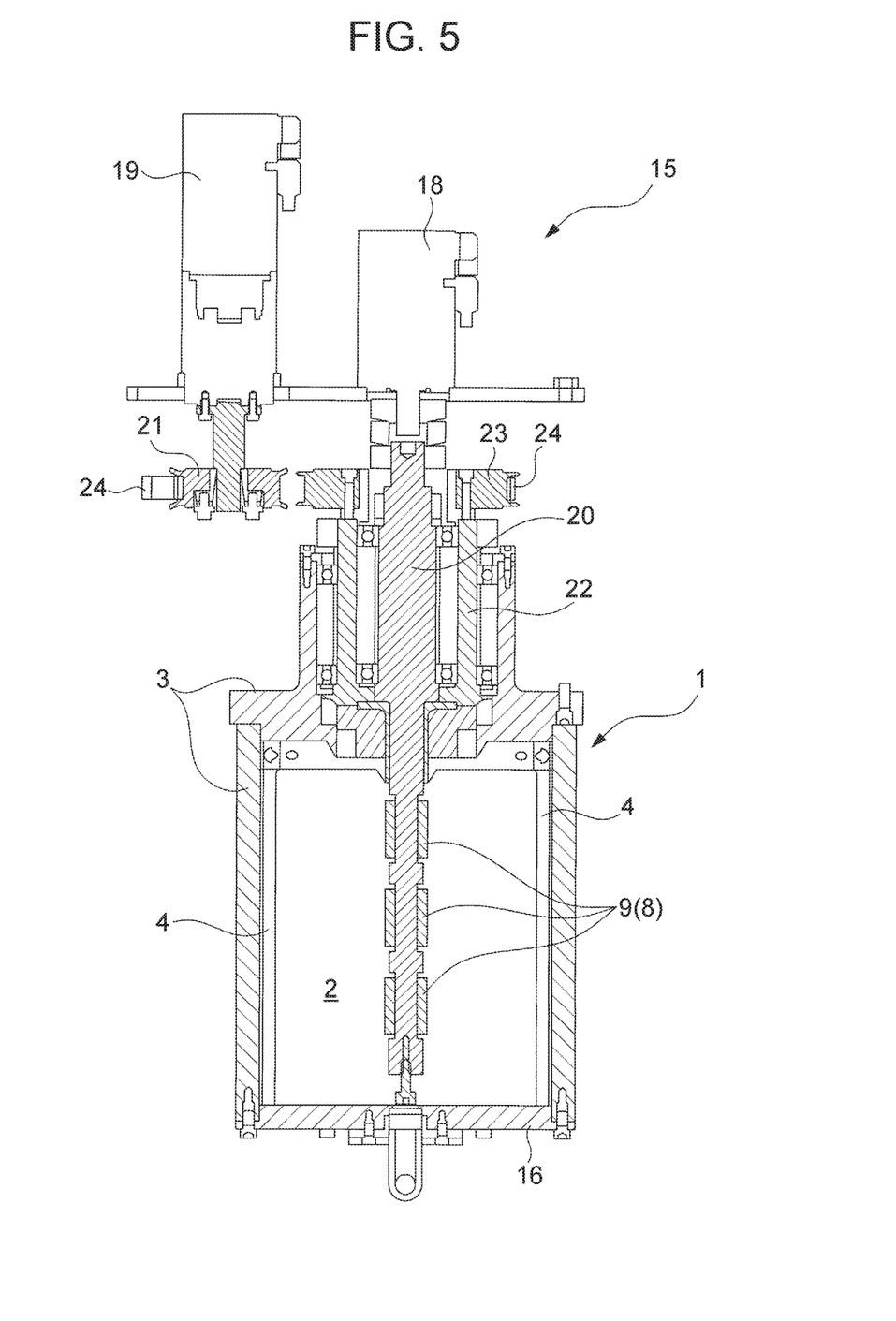
FIG. 5 is a sectional view of the granulated body manufacturing apparatus, for describing a configuration of a drive system.

Furthermore, behind the housing 3 in FIG. 1, a drive system 15 is disposed. The drive system 15 is a part that controls rotation of the agitation blades 4 and the crossing blades 5. A configuration of the drive system 15 and a relationship between the drive system 15, and the agitation blades 4 and the crossing blades 5 will be described with reference to FIG. 5. As illustrated in FIG. 5, the drive system 15 in the manufacturing apparatus 1 includes a first motor 18 and a second motor 19. The first motor 18 is a motor for driving the crossing blades 5 to rotate, and a second motor 19 is a motor for driving the agitation blades 4 to rotate.

A center shaft 20 is connected to the first motor 18. The center shaft 20 rotates upon the first motor 18 being driven. A distal end portion of the center shaft 20 is inserted in the internal space 2 of the housing 3. A position in which the center shaft 20 is disposed corresponds to the center axis of the cylindrical shape of the internal space 2. Then, the hub portion 9 of the framework body 8 is attached to the part of the center shaft 20 inside the internal space 2. Although the framework body 8 is not illustrated in FIG. 5, as described above, the wires of the crossing blades 5 are looped around the framework body 8. Consequently, the crossing blades 5 are driven to rotate by the first motor 18. Also, as can be understood from FIG. 5, one manufacturing apparatus 1 can include a plurality of framework bodies 8.

A first pulley 21 is attached to the second motor 19. On the other hand, a sleeve 22 is provided between the first motor 18 and the housing 3. The sleeve 22 is a cylindrical member, and the aforementioned center shaft 20 is inserted through the inside of the sleeve 22. A second pulley 23 is attached to an end portion of the sleeve 22 on the side close to the first motor 18. The first pulley 21 and the second pulley 23 are connected via a belt 24. Consequently, the sleeve 22 is driven to rotate by the second motor 19. As a matter of course, the rotation is independent from rotation of the center shaft 20 by the first motor 18.

The aforementioned agitation blades 4 inside the internal space 2 are attached to an end portion on the housing 3 side of the sleeve 22. The sleeve 22 and the agitation blades 4 are configured so as to integrally rotate around the center axis. Consequently, the agitation blades 4 are driven to rotate by the second motor 19. According to the above, rotation of the crossing blades 5 and rotation of the agitation blades 4 are independent from each other.

Figure 6:
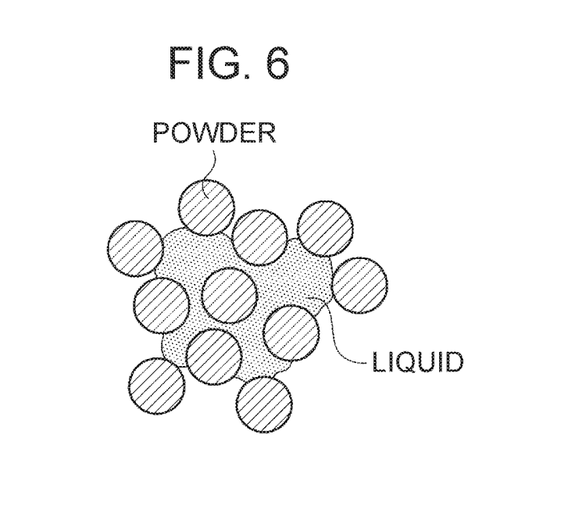
FIG. 6 is a schematic diagram illustrating a structure of a mass having a high bulk density.

In the manufacturing apparatus 1 configured as described above, a granulated body is manufactured as follows. First, the upper lid 17 is opened and raw material powder for a granulated body is put into the internal space 2 from the inlet 7. As a matter of course, the front lid 16 and the outlet door 13 are closed. Also, a liquid component is injected into the internal space 2 by the injection nozzle 12. An amount of the liquid component added is made to be small relative to an amount of the powder. Consequently, the raw material powder moistened by the liquid component is housed in the internal space 2. However, in this state, the raw material powder and the liquid component are inhomogeneously mixed. Thus, there are many masses formed as a result of aggregation of raw material powder into small balls (see FIG. 6). Then, the upper lid 17 is closed, and the agitation blades 4 and the crossing blades 5 are rotated. As a result of the rotation of the agitation blades 4, as illustrated in FIG. 2, the powder is agitated.

Figure 7:
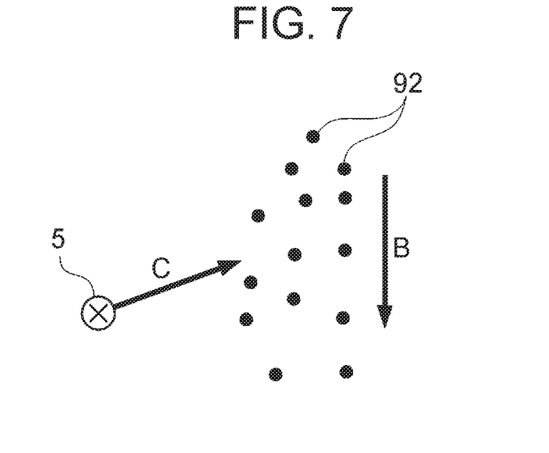
FIG. 7 is a schematic diagram illustrating crossing of falling powder and the rotating crossing blade.

Since the crossing blades 5 are also being rotated, the powder and the crossing blades 5 cross. In other words, as a result of the agitation, as described above, the powder slips down from an agitation blade 4 at the upper portion of the internal space 2 and falls downward (arrow B in FIG. 2). A route of the fall of the falling powder 92 and a route of movement of the rotating crossing blades 5 (arrow C in FIG. 7) cross. As a result of the crossing, the raw material powder and the liquid component are mixed and the whole powder is thereby brought into a homogeneously-mixed state. Also, the aforementioned masses are cut by the crossing blades 5 into finer particles. Consequently, a granulated body with the liquid component homogeneously mixed therein, the granulated body having a small particle diameter, can be obtained.

Also, as described above, the crossing blades 5 are arranged in a direction inclined relative to the axis direction. Such inclined crossing blades 5 cross the powder 92. Thus, a force received by the powder 92 from the crossing blades 5 contains a certain amount of a component in the axis direction. Consequently, the falling powder 92 moves also in the axis direction to a certain extent. This also contributes to achievement of the homogeneously mixed state of the whole powder.

Figure 8:
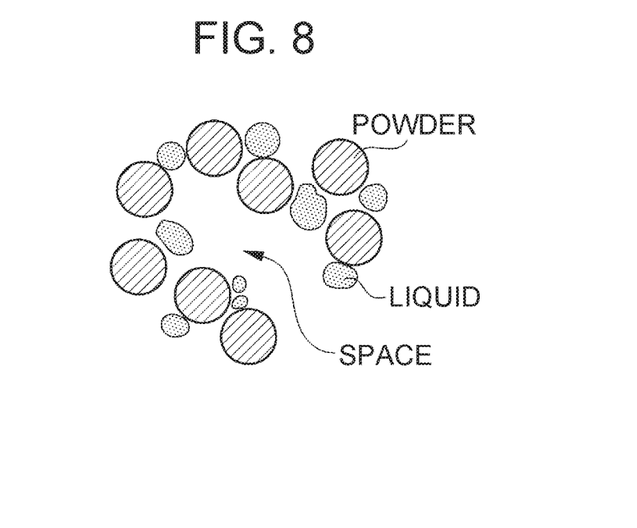
FIG. 8 is a schematic diagram illustrating a structure of a granulated body having a low bulk density.

In particular, even if the amount of the liquid component added is small relative to the amount of the powder, the liquid component is homogeneously spread over the whole powder. This is a state that should be called a moist granulated body, which is different from a state called a paste or a slurry. Such moist granulated body having a small particle diameter naturally has a low bulk density. Even if there remain parts of a somewhat large particle diameter, such parts merely include a space part such as illustrated in FIG. 8 formed as a result of the cutting by the crossing blades 5. In such a manner as described above, a granulated body having a small liquid component content, a small particle diameter and a low bulk density is manufactured. After sufficient agitation, the outlet door 13 is opened and the manufactured granulated body is taken out.

Figure 9:
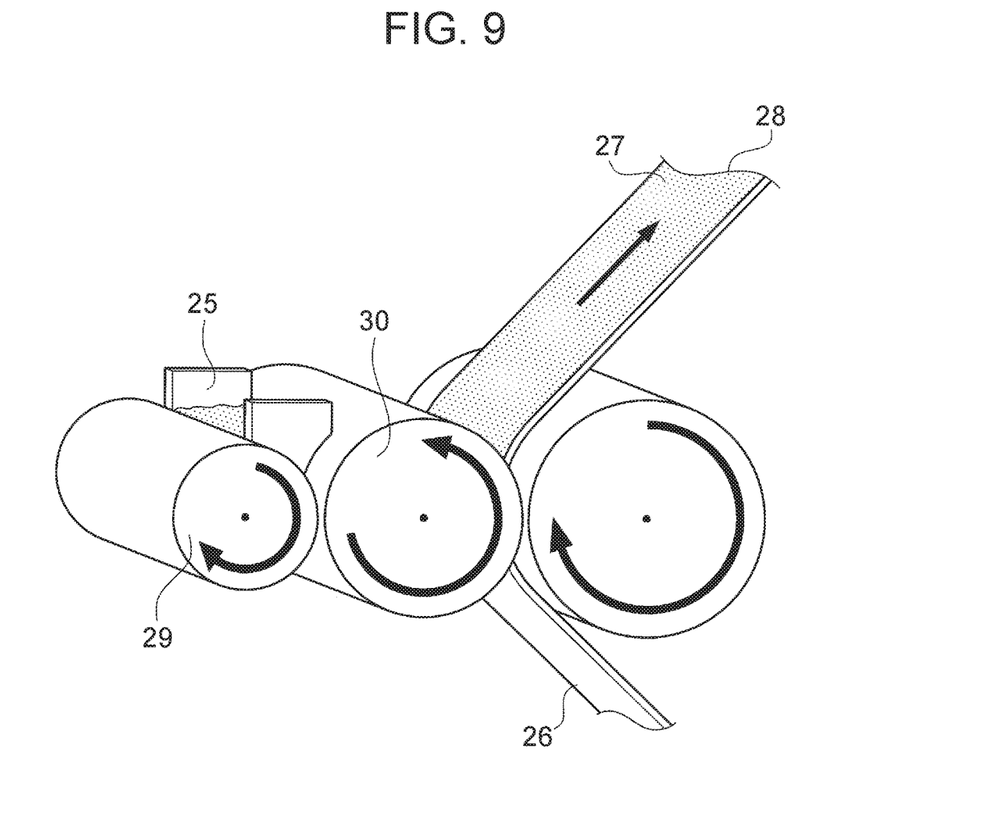
FIG. 9 is a perspective view of an apparatus for a coating process, which is an example of use of a granulated body to be manufactured.

Granulated body manufacture such as described above can be used for, for example, manufacture of a coating material for manufacturing of an electrode plate for a lithium ion secondary battery. In other words, as the above raw material powder, an electrode active material (e.g., a composite lithium oxide in the case of a positive electrode, and, e.g., black lead in the case of a negative electrode) and powder of various additives are put in and as the liquid component, a kneading solvent such as water is injected. Consequently, a moist granulated body having a relatively small liquid component content and a low bulk density compared to an active material paste used in an ordinary electrode mixture layer coating process. Such moist granulated body is put into, for example, an inlet portion 25 of a three roll-type coating apparatus such as illustrated in FIG. 9. Consequently, an electrode plate 28 with an electrode mixture layer 27 formed on a collector foil 26 is obtained. The electrode plate 28 requires only a short period of drying time in a drying process after the coating.

Figure 10:
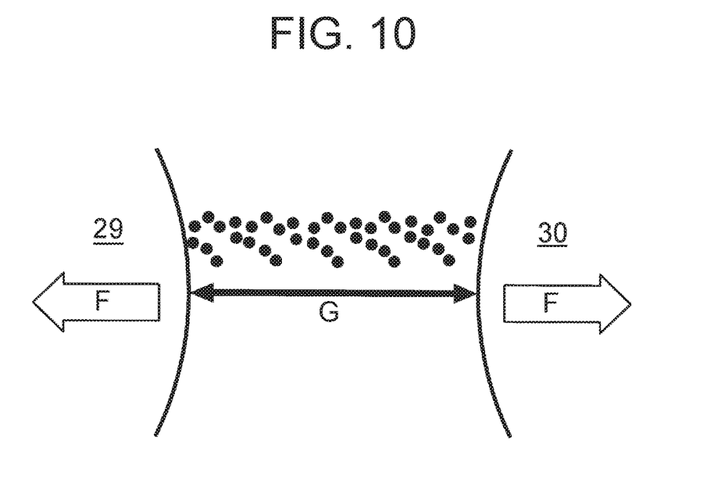
FIG. 10 is a sectional view illustrating a gap between rolls in a coating apparatus using a granulated body (case 1)

Also, a moist granulated body having a low bulk density is advantageous for the coating process itself. In other words, as illustrated in FIG. 10, a gap G between a first roll 29 and a second roll 30 can be made to be relatively large. A low-bulk density moist granulated body generates only a small reaction force F against compression when the granulated body passes through the gap G, compared to a high-bulk density one, and after the passing through the gap G, a film thickness of the granulated body less expands. As described above, since the gap G is large, a degree of an effect of variation and fluctuation of the gap G itself is relatively small. Also, a stiffness of a mechanism that holds the first roll 29 and the second roll 30 does not need to be so high.

Figure 11:
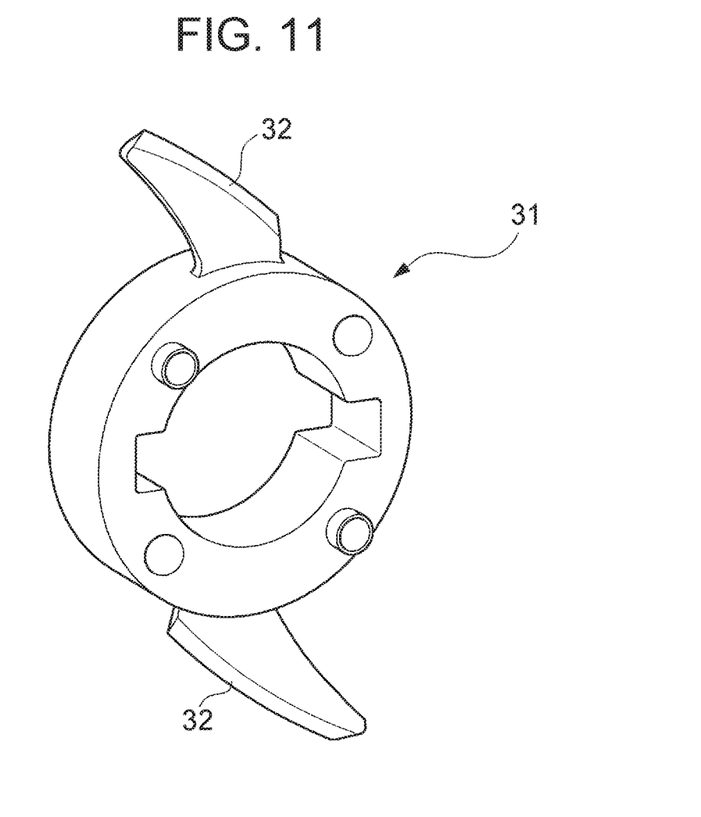
FIG. 11 is a perspective view of cutting blades in the granulated body manufacturing apparatus.
Figure 12:
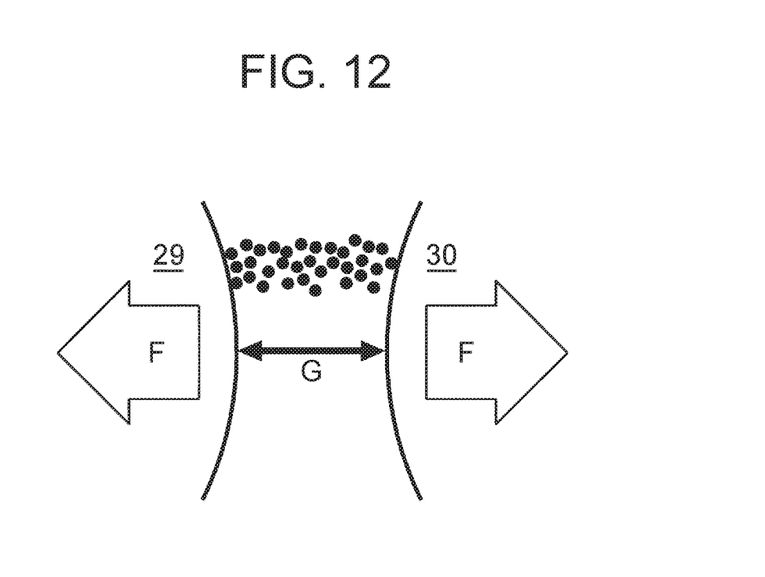
FIG. 12 is a sectional view illustrating a gap between rolls in a coating apparatus using a granulated body (case 2)

If cutting blades 31 such as illustrated in FIG. 11 are used instead of the crossing blades 5 in the manufacturing apparatus 1, a bulk density of a resulting moist granulated body becomes high. In the case of the cutting blades 31, raw material powder is crushed by respective planar cutting edges 32. Thus, in a coating apparatus, as illustrated in FIG. 12, it is necessary that the gap G be made to be small. This is because a high-bulk density moist granulated body generates a strong reaction force F, whereby a film thickness of the granulated body expands a little after passing through the gap G. Thus, the degree of the effect of variation or fluctuation of the gap G itself is relatively large. Also, the mechanism that holds the first roll 29 and the second roll 30 needs to have a high stiffness to endure the strong reaction force F. On the other hand, use of a low-bulk density moist granulated body obtained using the crossing blades 5 does not provide such disadvantages as those in the case of FIG. 12.

In the above, a smaller wire diameter of each wire used as the crossing blades 5 is better. Use of thick wires does not make much difference from use of the cutting blades 31 in FIG. 11. Therefore, for the wires, it is preferable to use ones having a diameter of 0.3 mm or less. Although a lower limit of the diameter is not specifically determined, in order to ensure strength of the wires themselves, it is desirable that the wires have a diameter of 0.1 mm or more. However, depending on a material of the wires, the wires having a diameter of less than 0.1 mm may be used. A material of the wires may be any material as long as the material has necessary strength and corrosion resistance. A typical example of the material may be stainless steel. Other examples of the material include, e.g., aluminum, carbon fiber and carbon nanotube. Also, the wires are not limited to ones each formed of a single wire and may be ones each formed of twisted wires.

Also, for rotation speeds of the agitation blades 4 and the crossing blades 5, it is preferable that the rotation speed of the crossing blades 5 be higher. This is because there is a difference in role between the agitation blades 4 and the crossing blades 5. In other words, while for the agitation blades 4 provided for powder agitation, a relatively-low rotation speed of around 30 to 120 rpm is sufficient, a relatively-high rotation speed of around 3000 to 6000 rpm is preferable for the rotation speed of the crossing blades 5. This is because it is desirable that the powder 92 be frequently cut by the crossing blades 5. Also, a higher rotation speed of the agitation blades 4 is better although the rotation speed is not need to be so high as the rotation speed of the crossing blades 5. This is because a higher frequency of the process of making the raw material powder fall downward from the upper portion inside the internal space 2 is more advantageous for causing cutting with a high frequency. Also, rotation directions of the agitation blades 4 and the crossing blades 5 may be the same or opposite to each other.

As described in detail, according to the present embodiment, the agitation blades 4 and the crossing blades 5 including thin wires are provided in the internal space 2 of the housing 3. Then, while a raw material is agitated by the agitation blades 4 inside the internal space 2, the crossing blades 5 are also rotated in the internal space 2. Consequently, the falling powder 92 is cut by the crossing blades 5 that are making rotational movement, without being crushed. As described above, a granulated body manufacturing apparatus 1 and a granulated body manufacturing method using the same that are suitable for manufacturing a granulated body having a small particle diameter and a low bulk density under a condition of a relatively small liquid component content are provided.

Figure 13:
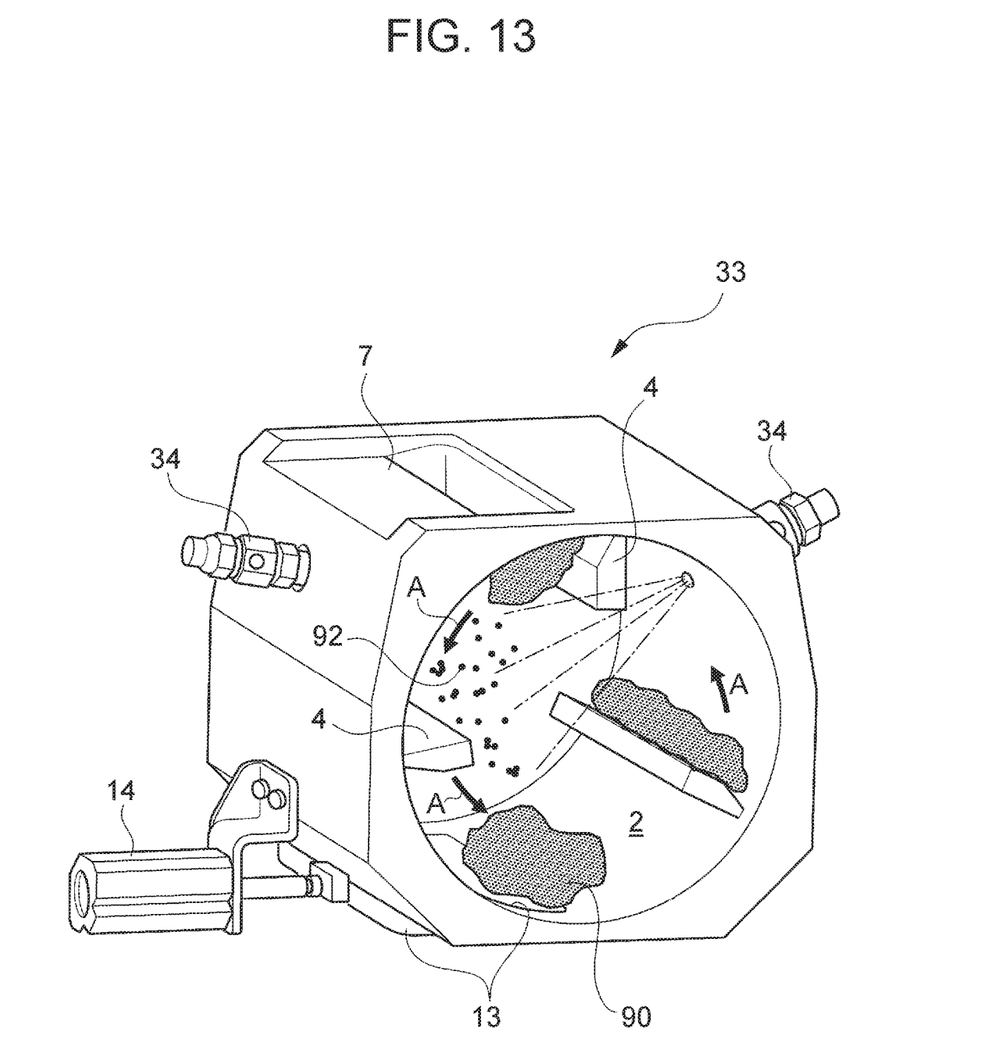
FIG. 13 is a perspective view illustrating granulated body manufacture in a second embodiment.

Next, a second embodiment will be described. In the present embodiment, a granulated body is manufactured in such a manner as illustrated in FIG. 13. A manufacturing apparatus 33 in FIG. 13 is similar to the manufacturing apparatus 1 in FIG. 1, but is different from the manufacturing apparatus 1 in the following point. In other words, a foaming nozzle 34 is provided instead of the injection nozzle 12. The foaming nozzle 34 is a nozzle that brings air into a liquid component to foam the liquid component and injects the foamed liquid component.

In the present embodiment, the crossing blades 5 in the manufacturing apparatus 1 in FIG. 1 may or may not be provided. FIG. 13 indicates an example of the case where no crossing blades 5 are provided. The below description will be provided on the premise that no crossing blades 5 are provided. In the manufacturing apparatus 33 in FIG. 13, agitation blades 4 are only rotary objects inside the internal space 2. The agitation blades 4 themselves are the same as those of the manufacturing apparatus 1 in FIG. 1. Although in FIG. 13, a drive system behind the manufacturing apparatus 33 is omitted, the drive system may be a simple one that only drives the agitation blades 4.

In the present embodiment, as a liquid component to be injected into an internal space 2 by the foaming nozzle 34, a liquid containing a surfactant agent is used. This is because injecting a foamed liquid component into the internal space 2 and mixing the foamed liquid component with a powder component facilitates achievement of the state illustrated in FIG. 8. This surely means that a resulting granulated body has a low bulk density.

The present embodiment is suitable for manufacture of a coating material for manufacture of a negative electrode plate for a lithium ion secondary battery. In this case, as raw material powder, powder of black lead, which is a negative-electrode active material, is used. Then, as a liquid component, an aqueous solution of SBR (styrene-butadiene rubber), which is a surfactant agent, is used. Methods for supplying these materials into the internal space 2 are the same as those in the case of the first embodiment. An amount of the liquid component added is made to be small relative to an amount of the powder. With these materials supplied in the internal space 2, the agitation blades 4 are rotated, whereby the raw material powder and the liquid component are mixed. It should be understood that a front lid 16 such as illustrated in FIG. 4 is closed during the mixing. Then, a foaming action of the surfactant agent causes the state illustrated in FIG. 8 at many sites, enabling provision of a low-bulk density, homogeneously-mixed, finer granulated body. Therefore, a favorable moist granulated body can be provided as in the case of the first embodiment. Then, use of this moist granulated body as a coating material in a coating apparatus such as illustrated in FIG. 9 enables manufacture of a favorable negative electrode plate.

As described in detail above, according to the present embodiment, raw material powder is agitated in the internal space 2 of a housing 3, and a liquid component containing a surfactant agent is injected into the internal space 2 to be mixed with the powder component. Consequently, a bulk density of a resulting granulated body is lowered using a foaming action of the surfactant agent. Consequently, a granulated body having a small particle diameter and a low bulk density can be manufactured under a condition of a relatively-small liquid component content, and thus, a method for manufacturing a granulated body particularly suitable for a coating material for a negative electrode plate for a lithium ion secondary battery is provided.

Note that the present embodiments are mere examples and are not intended to limit the disclosure in any way. Therefore, it should be understood that various improvements and alterations are possible without departing from the spirit of the disclosure. For example, although in the above description, the housing 3 is disposed so that the center axis direction of the internal space 2 is horizontal, the "horizontal" mentioned here does not need to be "exactly horizontal". Even if the center axis direction is inclined, the center axis direction can be considered horizontal as long as an angle of the inclination is no more than 10°. Also, the agitation blades 4 may be parallel to the center axis direction or may be somewhat inclined relative to the center axis direction. If the agitation blades 4 are slightly inclined, the falling powder 92 can be moved slightly in the axis direction, enabling provision of a more homogeneously mixed state.

Also, in the first embodiment, transmission of a driving force from the second motor 19 to the sleeve 22 may be performed via a chain or a gear train instead of the belt 24. Also, a rotation speed ratio between the agitation blades 4 and the crossing blades 5 may be fixed. In such case, the drive system 15 may be configured so that both the agitation blades 4 and the crossing blades 5 are driven by one motor. Also, in the second embodiment, the type of the surfactant agent is not limited to SBR.

What is claimed is:

1. A granulated body manufacturing apparatus comprising:
   a housing that includes a cylindrical internal space, is disposed so that a center axis direction of the internal space is horizontal, and houses a raw material for a granulated body inside the internal space;
   an agitation blade that is provided along an inner circumferential surface of the internal space, and upon being rotated around the center axis, scoops up the raw material accumulated in a bottom portion of the internal space and makes the raw material fall down from an upper position inside the internal space; and
   a crossing blade including a wire having a wire diameter not exceeding 0.3 mm, the wire being provided at a position in a range, inside the internal space, in which the crossing blade does not come into contact with the agitation blade, and upon being rotated around the center axis, crossing a route of the fall of the raw material and fining the raw material, and being looped around a framework body that is provided at a position in a range, inside the internal space, in which the framework body does not come into contact with the agitation blade, and rotates around the center axis.

2. The manufacturing apparatus according to claim 1, wherein:
   the framework body includes a hub portion that receives a rotational driving force from a rotation driving source, a first branch portion projecting outward from the hub portion, and a second branch portion projecting outward from the hub portion at a site that is different in an axis direction from that of the first branch portion; and
   the wire is looped around the first branch portion and the second branch portion.

3. The manufacturing apparatus according to claim 2, wherein the first branch portion and the second branch portion are provided at respective positions that are different from each other also in a circumferential direction around the axis.

4. The manufacturing apparatus according to claim 1, wherein a rotation speed of the framework body is higher than a rotation speed of the agitation blade.

5. The manufacturing apparatus according to claim 2, wherein a rotation speed of the framework body is higher than a rotation speed of the agitation blade.

6. The manufacturing apparatus according to claim 3, wherein a rotation speed of the framework body is higher than a rotation speed of the agitation blade.

7. A granulated body manufacturing method comprising:
   housing a raw material for a granulated body in a cylindrical internal space disposed so that a center axis direction of the cylindrical internal space is horizontal;
   rotating an agitation blade around the center axis, the agitation blade being provided along an inner circumferential surface of the internal space, and scooping up the raw material accumulated in a bottom portion of the internal space and making the raw material fall from an upper position inside the internal space; and rotating a crossing blade around the center axis, the crossing blade being provided at a position in a range, inside the internal space, in which the crossing blade does not come into contact with the agitation blade, making the crossing blade cross a route of the fall of the raw material and fining the raw material, a wire having a wire diameter not exceeding 0.3 mm being used for the crossing blade, the wire being looped around a framework body that is provided at a position in a range, inside the internal space, in which the framework body does not come into contact with the agitation blade, and rotates around the center axis.

8. A granulated body manufacturing method comprising:

housing a raw material for a granulated body in a cylindrical internal space disposed so that a center axis direction of the cylindrical internal space is horizontal;

rotating an agitation blade around the center axis, the agitation blade being provided along an inner circumferential surface of the internal space, scooping up the raw material accumulated in a bottom portion of the internal space, making the raw material fall from an upper position inside the internal space and fining the raw material; and injecting a foamed liquid containing a surfactant agent into the internal space while rotating the agitation blade, and mixing the raw material with the liquid.

* * * * *